United States Patent [19]

Wicker

[11] Patent Number: 5,271,645
[45] Date of Patent: Dec. 21, 1993

[54] PIGMENT/FLUORESCENCE THRESHOLD MIXING METHOD FOR PRINTING PHOTOCOPY-PROOF DOCUMENT

[76] Inventor: Thomas M. Wicker, 6600 Cleary Rd., Apt. 2, Livonia, N.Y. 14487

[21] Appl. No.: 771,611

[22] Filed: Oct. 4, 1991

[51] Int. Cl.⁵ .............................................. B42D 15/00
[52] U.S. Cl. ......................................... 283/92; 283/91; 283/89; 283/902; 162/140; 106/19; 253/301.35
[58] Field of Search ........................ 106/19, 20, 21, 22; 162/140; 252/301.35, 301.16; 283/89, 91, 902, 92

[56] References Cited

U.S. PATENT DOCUMENTS

| | | | |
|---|---|---|---|
| 3,713,861 | 1/1973 | Sharp | 283/89 X |
| 3,928,226 | 12/1975 | McDonough et al. | 252/310.35 |
| 4,066,280 | 1/1978 | LaCapria | 283/902 X |
| 4,522,429 | 6/1985 | Gardner et al. | 283/902 X |
| 4,582,346 | 4/1986 | Cario et al. | 283/902 X |
| 4,884,828 | 12/1989 | Burnham et al. | 283/89 |
| 4,921,280 | 5/1990 | Jalon | 283/89 X |
| 5,018,767 | 5/1991 | Wicker | 283/902 X |
| 5,084,205 | 1/1992 | Auslander | 252/301.35 X |

*Primary Examiner*—Paul A. Bell
*Attorney, Agent, or Firm*—Schmeiser, Morelle, Watts

[57] ABSTRACT

Commercially available pigments mixed with fluorescence compound to obtain print stuff mixtures for transfer thereafter to mattes. The print stuff mixtures obtainable thereby are used to print securitY and face-value documents which will be color copier resistant, that is, not be accurately reproducible or replicable by a photocopier. An empirical test is provided which will allow the ordinary skilled printer to determine the best titer of commercially available fluorescence to be used in the ink/pigment mixing scheme.

7 Claims, No Drawings

PIGMENT/FLUORESCENCE THRESHOLD MIXING METHOD FOR PRINTING PHOTOCOPY-PROOF DOCUMENT

BACKGROUND OF THE INVENTION

1. Field of the Invention

This invention relates generally to the methods for mixing printing inks and pigments with fluorescence-inducing material and, specifically, to an improvement in the mixing thereof, termed a threshold mixing method, in which the resultant ink/pigment and fluorescence (printing) compound mixture, when applied to a document substrate, will render the document resistant to photocopying. The invention inculcates a pigment-fluorescence mixing technique by which a particular mix threshold will be reached for assuring that a document printed with the mixed print stuff will reflect a significant amount of white light irrespective of the pigments therein, so as to effect a significant degradation in the document's copy, when such copy is produced by a modern photocopy machine.

2. Discussion of Relevant Art

Numerous attempts have been made to literally "blind" a photocopying device, thus preventing the machine from accomplishing its intended purpose. Almost invariably, these attempts have been made in the interest of securing anti-counterfeit protection for a security or face-value document. Today, the greatest need for secure documents is found in finance for security or negotiable paper such as checks, notes, bonds etc.. Various methods for rendering the aforesaid documents resistant to photocopying include the use of different types of substrates (mattes, paper, etc..), different types of printing (pattern, density of ink mixes, etc..) and/or different kinds of inks, dyes or pigments (print stuff). In the first and second of the aforementioned categories, U.S. Pat. No. 4,522,429, issued to Gardner et. al.. in 1985, discloses a means of providing either colored printed information (or a colored matte) that will frustrate photocopying because coloration mixtures are provided which fall within the human eye's reflection spectral response, but not within the spectral response of the photocopy device. Thus, either the printed information and/or the matte may be seen by the human eye in white light, but cannot be detected by a photocopy machine using its normal lighting, detecting and copying protocol.

Yet another method for producing the copy-proof document, but categorized in the latter of the aforementioned groups (variation of print stuffs), is found in the patent issue to LaCapria in 1978, U.S. Pat. No. 4,066,280. In this disclosure, the patentee teaches his method for frustrating a modern color copier by using a printing ink which is specularly reflective through the use of powdered aluminum which is suspended therein. Since a particle of aluminum is reflective of almost all the white light impinging thereon, LaCapria's suspension of aluminum particles in relatively clear varnishes allows one to see pigmentation included therewith or proximate thereto while providing a high degree of reflectivity to the photocopier illumination. Such a device imparts "flare" to the document (flare is excessive lightening of the images).

The disadvantages to the above-mentioned patent methods and articles are apparent, rather intuitively. In patent '429, the common window of pigment reflection/eye response is quite narrow; therefore the printed matter is so light that commonly used security documents, which are generally printed at great expense, would be poor subjects for exploiting the Gardner et. al. technique. In the latter case, +280, the presence of metallic stuff, no matter how minute, in the fountains of printing presses is but the first problem encountered. The more prevalent problem encountered with the (addition of) reflective particulate matter in printing inks would be manifested in the soiling of the document through normal usage and handling, a spoiling of surface reflectivity. Furthermore, the LaCapria technique requires that a security document be completely redesigned, lest a counterfeiter merely copy an unprotected circulation document and acquire "counterfeit-proof" copies by overlaying a counterfeit-copied document with a varnish layer or print containing the particulate of the +280 disclosure. Thus, not only is the production of the LaCapria document expensive from an ink cost standpoint, but also from that of having to change what might already be a well-known and recognized document, for example, a national currency note or traveler's check.

One other recent development has been government use of devices and microprint techniques to frustrate photocopy counterfeiters. Special threads in the document substrate (matte), often included with paper manufacture, are expensive. Microprinting simply does not "alert" the most common victim of counterfeiting—the consumer. Furthermore, all of the aforementioned techniques, and the documents they are used to produce, do not stop counterfeiting as it has always been performed by the veteran counterfeiter, who prefers to make (first) an offset or intaglio plate. To do this, one need only make a "presentable" photograph/photocopy. Thus, anti-copyability of the document must be the tack taken in any scheme to produce copy-proof documents. Therefore, in contrast to the aforementioned methods and articles, I have sought and discovered a new and wonderful means for frustrating the counterfeiting, by photograph and photocopier, of practically any printed document.

As is well known in classical physics, most colors are observed because the objects upon which white light impinges absorb some wavelengths from the white light and reflect others. It is also known that part of the light absorbed actually passes below the surface of the object, at least so far as the surface coloration or pigmentation is concerned, with internal refraction causing certain of the color wavelengths to be retained (absorbed) and others to reemerge, reflectively giving or imparting the "color" to the object. Since the color white reflected from the object's surface is "white light" (containing all the wavelengths of visible light), it follows that, if the reflecting surface can be altered in some way (perhaps by other mechanisms), more white light (or at least more of the wavelengths that would be initially absorbed) could be reflected. This is the operating premise of my invention.

I have found that in certain chemical compositions, it is possible for additives to be combined with conventional inks, pigmentation, toner or the like (to form a "print stuff") so as to effect such a change in reflectivity when illumination is brighter than normal daylight. I make a certain mixture of chemical compositions that manifests a certain effect under one type of light, while it manifests an altogether different effect (on a document) under the light which is generally employed by photocopiers, that is, white light at about 6500° K. The concept of using fluorescence, as either a fluorescent pigment or a separate compound which lends a fluorescent characteristic to a pigment is not new. Indeed, in LaCapria +280, there is disclosed an example in which fluorescent pigment is balanced first with printing media constituents and then mixed in rather high proportion with the powdered aluminum in synthetic alkyd varnish. The final mixture, comprising the print stuff disclosed, contains approximately (by weight) 29-30% fluorescent pigment. However, +280 gives no indication of the degree of fluorescence found in the pigment, only that it is clearly observed fluorescing under an ultraviolet light. It can be masked by the aluminum content or, if used excessively, tends to mask the specular reflection of the aluminum. Thus, it is clear that LaCapria seeks to embody in his inks both specular reflectance and fluorescent characters. I have chosen to rely upon a fluorescence-inducing chemical additive, known in the trade simply as "fluorescence" in such a manner that the characteristic of fluorescence grants nothing in the way of document counterfeit detection in its genuine form while in daylight or normal artifical lighting, but under the photocopier light or photoflood/flash light sources, imparts significant increase in the other wavelengths of light reflected from a document surface. This increase becomes evident to the observer by the production of a "copy" that is obviously bogus. The invalidity of this copy is evidenced by the degradation of copy quality that results from modest to severe (and often, extreme) washout of print stuff coloration or color "skewing" (shift in wavelength). What appeared under normal light (along with its usual ultra-violet component) as a colored printing is copied (under the photo/photocopier light source) as a self-evident color imperfect, washed out (over lightened) and "non-passable" imitation of the genuine document. It is virtually impossible to produce a printing plate from a copy of my invention.

The properties of fluorescence now being well understood in both academia and industry, I will not digress any further thereinto. Suffice to say, however, that I have found generally available fluorescent pigment of both organic and inorganic constituency to be efficacious in the practice of this invention. Briefly, those of biological origin are, among many others, chlorophYll a (Chl a) and many of the chemical species of Chl a (say, the photosynthetic algae comprised mainly of monovinyl Chl a) and related compounds found in autotrophic bacteria, bacteriochlorophylls (Bchl). Quite matter of factly, in plants excitation is generally dissipated in one of two principal activities, fluorescence and/or photosynthesis. There are several known pigments having absorption characteristics, and consequential fluorescence characteristics, and which are generally described as Chl a, Bchl a and b, Chl-650, 660 and the Alcphycocyanins and Phycocyanins. In the inorganic chemical realm, the following are often employed for their ability to fluoresce at the indicated colors: barium silicate-black; cadmium borate-pink; calcium halophosphate-white; calcium silicate-orange; calcium tungstate-blue; strontium halophosphate-cyan; and zinc silicate-green. Not surprisingly, all of the aforementioned materials absorb strongly in the UV wavelength at $253.7 \times 10^{-9}$ cm., proximate a strong emission line for a mercurY arc lamp. As most persons have now experienced, most man-made objects fluoresce to some degree in the presence of "black light" (UV). This is not surprising because many of the aforementioned inorganic (and some of the organic) substances are found in everything from modern polymeric articles to white shirts and writing paper, particularly when the latter two have had fluorescent dyes added to them in order to make them appear "whiter" after washing, exposure to air or purely natural circumstances. Yet, aside from the "whitening" or high-lighting ability of certain fluorescents, makers of security documents and face-value documents do not wish to have their paper appearing as "black light posters" which, needless to say, are also produced at rather high cost. Fortunately, the method I have discovered, as well as the article produced thereby, is relatively inexpensive and, for its intended purpose of avoiding reasonably accurate photo/photocopier duplication, very efficacious. The principal reagent to which I will hereinafter refer as "fluorescence" is any of the commercially available fluorescence compounds that are available in either the fluorescent pigment of LaCapria or a relatively colorless fluorescence (which is a dye) used in the printing industry today. Further, I will concentrate more heavily on the aspects of photocopier frustration, but it should be understood, not necessarily to the exclusion of photo(-graphic)proofing which is a corallary thereto.

SUMMARY OF THE INVENTION

I have acquired the overall objective of this invention by the mixture of industrially available pigments (inks, dyes, etc.) in combination with fluorescence compounds (printing additives) to acquire a print stuff which, when placed on a suitable substrate (which I term herein "matte"), results in a photocopier replication that is so significantly degraded in color and diminished in overall quality that it cannot be passed in commerce under any reasonable circumstance. Neither can it be used to produce a printing plate, particularly a photosensitive off-set plate.

Currently in the printing industry, fluorescence is added to the end coloration mix, i.e. the completed pigment composition that the printer desires to place on the matte. For example, if a green is desired, a mixture of cyan and yellow is made and then fluorescence is added very carefully in order to acquire the desired fluorescing effect, but not so much as to dilute and wash out the color of the pigment mixture. As those familiar with this technique will attest, reflection is readily measured by a device known as a spectroscope; however fluorescence cannot be measured by the same means that are used to measure reflectivity or reflectance because fluorescence is, more or less, generated by the object from which it radiates. This is readily seen because spectrophotometric determinations (of reflectance) are made through a light source which emits light of all the wavelengths at which such measurements are to be made. But fluorescing materials are generally lacking in any of the wavelengths in which they will not fluoresce, and the photocell in the spectrophotometric determination means has no standard available for measuring the relative reflectance of a particular wavelength. Instead, what is used in the industry is a relative percent of fluorescence (under UV light) that a particular dye or pigment will emit; and that quantum of "fluorescence" is generally about 4.0% in the case of a pre-mixed fluorescent dye (print stuff) or in the case of a pigment plus fluorescence (mixture) made according to manufacturer's directions and without diminution in, or alteration of, the coloration (density) of the mixture.

Thus, as taught by LaCapria +280, a balance achieved between a fluorescent pigment and another additive is, indeed, a bit tricky. Further, since the generally clear pure fluorescence additive can dilute a pigment, it is necessary to exercise extreme care, lest the pigment be diluted and the desired density, hue and coloration of the print stuff on the document not be achieved. Thus, what impelled me to develop my threshold mixing technique, as more fully disclosed hereinafter, is the need for a print, on any suitable matte, that would "blind" (to a varying degree) the recording device e.g., photocopier, particularly the modern color laser copier. I discovered through many attempts to create a document that would fluoresce (perhaps) well in the presence of UV light, but not to any great degree under normal daylight. Further, I knew that many inorganic substances fluoresce, but wanted to distinguish on the use of particular inorganics that worked well in solutions of polynuclear aromatic hydrocarbons or plastics, as well as the organic fluorescence which would also be compatible therewith. This is because fluorescence addition to certain classes of "plastics" such as thermally, UV or high energy radiation-cured cycloaliphatics and other polymerics are now being used as printing pigments. I am particularly sensitive concerning the UV-cured polymers mentioned because I utilize UV radiation to establish my threshold test for determining the proper (wet, not cured) mixture of pigments and fluorescence that will satisfactorily frustrate the modern photocopier to the extent previously mentioned herein.

One final factor has become quite evident in the aforementioned empirical studies. If a document or cured printing "fluoresces" under black light, primarily caused by the fluorescence titer used industry-wide or such as suggested by LaCapria +280, it will copy quite acceptably on any(properly adjusted and tuned)-photocopier and photograph. Fluorescence is definitely needed in the print stuff of my invention, but a certain titer or threshold is seen to be not only sufficient, but necessary, for effecting the invention, while any more (or less) simply results in a passable counterfeit replication. The heart of my methodology then, is the threshold test that works fundamentally insensitive to, and in complete ignorance of, manufacturer's mixing specifications; yet it permits one of ordinary skill in the printing art to repeat my copy-proof document invention.

DETAILED DESCRIPTION OF THE PREFERRED EMBODIMENT

The datum which led to my present invention concerns the use of printing fluorescence additives, such as readily available in today's market and used rather extensively in the printing industry. I realized, as many before me, that a fluorescent poster, for example, copies quite well on a modern color copier. In fact, the fluorescent matte "whiteners" that are added to many papers do not appear out of balance with other printed indicia when they are copied on the same type of copier. Yet, during one of my routine "fluorescent-type" experiments, I discovered that a mixture of fluorescence with ordinary printing pigments, which were prepared for printing a document, actually resulted in a document that could not be accurately copied by laser color copiers I was then employing—the Canon 200 TM and the Canon 500 TM. When I exposed the containers of wet matter (which, when dry, failed to fluoresce properly) to black light (UV) I was surprised to note that it barely fluoresced. I attributed this to the fact that I did not use premixed fluorescent pigments, having had to resort to my own mixture of pigment(s) and fluorescence. Having first noted what the actual mixture consisted of, I added more fluorescence in order to acquire activity under black light. Thereafter, I was astonished to discover that a document or poster printed with this new, but altered, "barely fluorescent" mixture now copied quite adequately on the Canon TM machines. The datum I noted was: "if it fluoresces under black light, it copies on a photocopier, but if marginal (bare) fluorescence occurs in the wet mix, dry (on a document) appears to flare". I realized that this constituted a very important threshold (test) which I could employ to gain my anticopy invention objective.

I first worked with a single color, a purple such as found on the major portions of a well known negotiable instrument (face-value document) and mixed pigments and fluorescence according to the manufacturer's specifications. The steps are well known in the art and comprise the following:

(a) mix two or more of what are termed primary colors i.e., yellow, magenta and cyan, to acquire purple by;

(b) mixing in the percentages necessary to give a first predetermined density for a desired print color, while (c) holding the mixture within certain density limits when adding fluorescence (i.e. balancing the color and fluorescence components); and (d) printing with the desired color (purple) followed by subsequent printing with other colors mixed in the same fashion.

The most notable result following the aforementioned routine is that the printing will have the desired fluorescence characteristic (an "iridescence" in daylight, bright luminescence in UV), but will be perfectly copyable by the photocopier. Relative to substep (c), the balancing step, I would mention that this is done because those of skill in this artform understand that too much fluorescence in the mixture will dilute the color hue and density; and too little fluorescence will result in losing either the visual effect under daylight and/or the fluorescing effect under a black light (the UV component of white light).

Further to the above method, I attempted once again to add the mixed purple pigment to the now fluorescing mixture so as to bring the resultant document just below the level of fluorescence (in the presence of black light). I reasoned that, if the point of fluorescence is indeed the true threshold at which I might expect a failure to fluoresce (hereinafter, in conjunction with black light) coupled with the failure to photocopy properly, I could correlate the amount of fluorescence required to achieve this dual phenomena quite readily. Using standards that are well known in the printing art for mixing purposes, the first threshold I developed was at a fluorescence level of approximately 4.0%, that routinely acquired in this art. When the fluorescent stuff (ink mixture) was then applied to a matte, I observed to my dismay that it fluoresced and photocopied perfectly. I attempted to dilute the ink mixture with pigment, thus decreasing the titer of fluorescence in the mixture. Again, the results were disappointing in that I not only lost the fluorescent character of the printing, but it copied quite well, anyway. I now realized that the original successful (anti-photocopying) document contained more than a mere pigment-fluorescence balance, but a critical fluorescence titer not known in the industry because everyone addressed mixing methods almost habitually. In reviewing my notes I realized that I had indeed used a mixing method, unsuggested by any manufacturer for fluorescence and pigments, not heretofore seen in the art. My invention actually consists in a mixing methodology using color pigments and fluorescence additives to a certain threshold of mix as inferred from a black light test or by photocopier printing tests (the latter, a hit or miss activity, not preferred).

To acquire the aforementioned successful printing (that which neither "barely" fluoresced nor photocopied), I employed the following procedure:

(a) based upon the shade of purple (or color) I desired, I used the blue constituent (first of two) which may itself be a multi-color (component) mixture and treated it with the fluorescence substance at not the manufacturer's recommended titer, but a level I knew would barely fluoresce when "wet" in its container;

(b) selected the red constituent (the second of two) which may also be a multi-color component mixture and treated it as I had the blue, with fluorescence; and (c) thereafter mixed my "barely fluorescent blue" with the "barely fluorescent red" (fluorescing constituents) of the above steps in proper proportions to obtain the desired shade, hue and printing density of "barely fluorescent purple". I then did the same for other colors I wished to use in a particular printing (e.g., greens and grays) and, after printing a document with the mixtures of my own invention, found that the document looked normal in sunlight, but brightened excessively (to the point of what may be termed "flared") when copied by the Canon=photocopiers. The flaring phenomenon, actually a drastic increase in a white light (all visible light components) reflection reduced color prominence on the document anywhere from 50% to 100%, resulting in areas of greatly diminished color, extremely lightened colors or completely white. Moreover, I have discovered that when the document printing density increases from about a 0.4 density upward, even though less flare is noticeable and the intensity of coloration approaches the master (printed) document's print densities more closely, a color "skewing" (spectral shift) is immediately noticeable and manifested in different ways by the various color copiers. For example, a Canon 200 TM attempting to color copy a gray-green of density approximately 0.6 will produce a copy that is "color heavy" in the blue component, with noticeable flare (whitening) in areas where the original printed document densities ranged below 0.4. On a machine such as the Canon 500 TM, although various portions of the document contained but a modest degree of flare (some less than 0.4 density areas) and but a slightly yellower (and lighter) coloration, there were various "pixels" (picture elements) of the printed document that had been rendered in Yellow, magenta, black and pin-k!In effect, since the threshold test was still being applied, what I observed was a synergistic effect brought about by working with fluorescent constituents and components of a particular desired color, rather than following the industry-wide standard of mixing first the desired color, then adding fluorescence. The fluorescence in the case of my invention appears to affect the more advanced color copiers at higher densities than normally used in printing security documents. I attribute this to an ability of the fluorescence compound to sequester pigment particles (or molecules) respective of the individual constituents, components and even sub-components (of colors). Thus, when all of sub-components and components of constituents are mixed to form the desired color with necessary fluorescence level, the more technically advanced machines are capable of "seeing" under certain conditions and unlike the naked eye, some of the components of the principal colors being employed because the machine does not appear to register or record each and every increment of a pixel of a document being copied (probably because its scanning protocol, in scan pitch is incapable of accommodating such delineation of print patterns into smaller increments of discrete color) with the result that a singular component or two predominate for that/those pixels. Further, the light (intensity) used by the copier is much greater than daylight and an unusual action between activated fluorescence and surface reflection (the coated/sequestered particle) ensues.

The essence of the invention is best understood by reference to two schema I often use, one using but a single (primary) color, the other a blend of primaries.

EXAMPLE 1

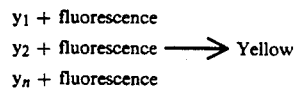

A desire shade of a primary is readily obtained because the component ($y_n$) all have the invention quality; their mixture does not diminish their character and it is not necessary to balance an already mixed yellow with fluorescence. Further all $y_n$ may be shelf itenms and be used for other mixtures.

EXAMPLE 2

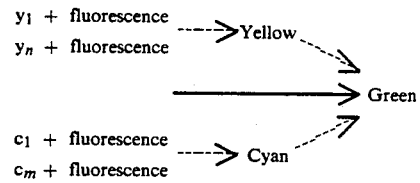

OR, the Yellow and Cyan may be individually made to include the invention.

It follows the, that my method works best when fluorescence, according to my "black light threshold" mixing scheme, is added at the color component level best suited to the printer's (user's) needs. This methodology is also valid if only pure primary colors are used to obtain all others. The critical point is the correct fluorescence/pigment balance that obtains the desired printing.

Thus, the reader may now realize that not only may my invention be used quite successfully in itself, but will greatly enhance other printing techniques that are presently used in modern counterfeit prevention. In addition to Wicker's U.S. Pat. No. 5,018,767, my invention would greatly increase the value of techniques employed by Castagnoli (U.S. Pat. No. 4,588,212), Jemseby et. al.. (US Pat. No. 3,862,501), Caprio et. al.. (U.S. Pat. No. 4,582,346) and many more. To these and other artists I commend my invention, consistent with the hereinafter appended claims.

What is claimed is:

1. A document which is not accurately copyable by a photocopier comprising:

a substrate which is a matte onto which indicia are printed; and indicia comprising a coating mixture including at least one pigment means and a fluorescence printing means in a quantity such that said mixture, when not yet dry, exhibits only a slight fluorescence under ultraviolet light, said fluorescence barely discernable to the naked eye; and, when cured on said matte, the mixture is not accurately replicable by the photocopier.

2. The document of claim 1 comprising a suitable matte and indicia comprised of the mixture printed on the matte in densities at or about 0.4, thereby inducing changes in a photocopier replication of said doucment ranging from flaring to color shifting as said density varies from below to above 0.4.

3. An improved method for making a photo-copyresistant document comprising:

preparing a mixture of printing pigment and a fluorescence compound, in the presence of ultra-violet light, only until a slight fluorescing begins, as discernable by the naked eye;

printing the mixture onto a substrate so that upon drying of said printing pigment and said compound, said document is obtained.

4. The method of claim 3 wherein preparing further comprises adding only said mixture to additional pigment for the purposes of balancing density.

5. The method of claim 3 wherein preparing further comprises:

mixing of a second mixture of a second printing pigment and said fluorescence compound according to said preparing step; and adding said second mixture to said claimed mixture to obtain a third mixture for use in said printing step.

6. A photocopier nonreplicable document comprising a substrate at least partially coated with a mixture of printing pigment and fluorescence compound, said mixture in a pigment-fluorescence balance that fluoresces only slightly under ultraviolet radiation when the mixture is wet and ceases to fluoresce when dried, the document exhibiting flaring and/or color shifting respectively between print desnities slightly below and above about 0.4 when photocopied.

7. An improved method for making a photocopy resistant document comprising: mixing to a threshold a pigment which is to be part of a desired print stuff mixture with a fluorescence compound; observing said mixing in the presence of fluorescence-activating ultraviolet radiation, said mixing being carried out only until a threshold is reached at about which a slight fluorescing occurs as discerned by the naked eye, thereby obtaining said print stuff mixture; and printing said print stuff mixture onto a substrate, thereby acquiring said document upon curing of said print stuff mixture.

* * * * *